United States Patent [19]

Eguchi

[11] Patent Number: 4,495,575
[45] Date of Patent: Jan. 22, 1985

[54] INFORMATION PROCESSING APPARATUS FOR VIRTUAL STORAGE CONTROL SYSTEM

[75] Inventor: Kazutoshi Eguchi, Tokyo, Japan

[73] Assignee: Tokyo Shibaura Denki Kabushiki Kaisha, Kawasaki, Japan

[21] Appl. No.: 441,095

[22] Filed: Nov. 12, 1982

[30] Foreign Application Priority Data

Dec. 9, 1981 [JP] Japan .................. 56-198185

[51] Int. Cl.³ .................................. G06F 13/00
[52] U.S. Cl. .................................. 364/200
[58] Field of Search .................. 364/200 MS File

[56] References Cited

U.S. PATENT DOCUMENTS 3,829,840  8/1974  Burk et al. .................. 364/200

Primary Examiner—Raulfe B. Zache
Attorney, Agent, or Firm—Kenyon & Kenyon

[57] ABSTRACT

An information processing apparatus for a virtual storage control system performs accessing of a buffer memory from a CPU with sum data of space identification data for identifying multi-virtual spaces and a virtual address within one virtual space. The sum data is also supplied to an address conversion section to perform conversion of the virtual address into a real address in parallel with accessing the buffer memory. If the corresponding record is hit in the buffer memory, the corresponding data is fetched from the buffer memory. If not, data is fetched from a main memory.

7 Claims, 6 Drawing Figures

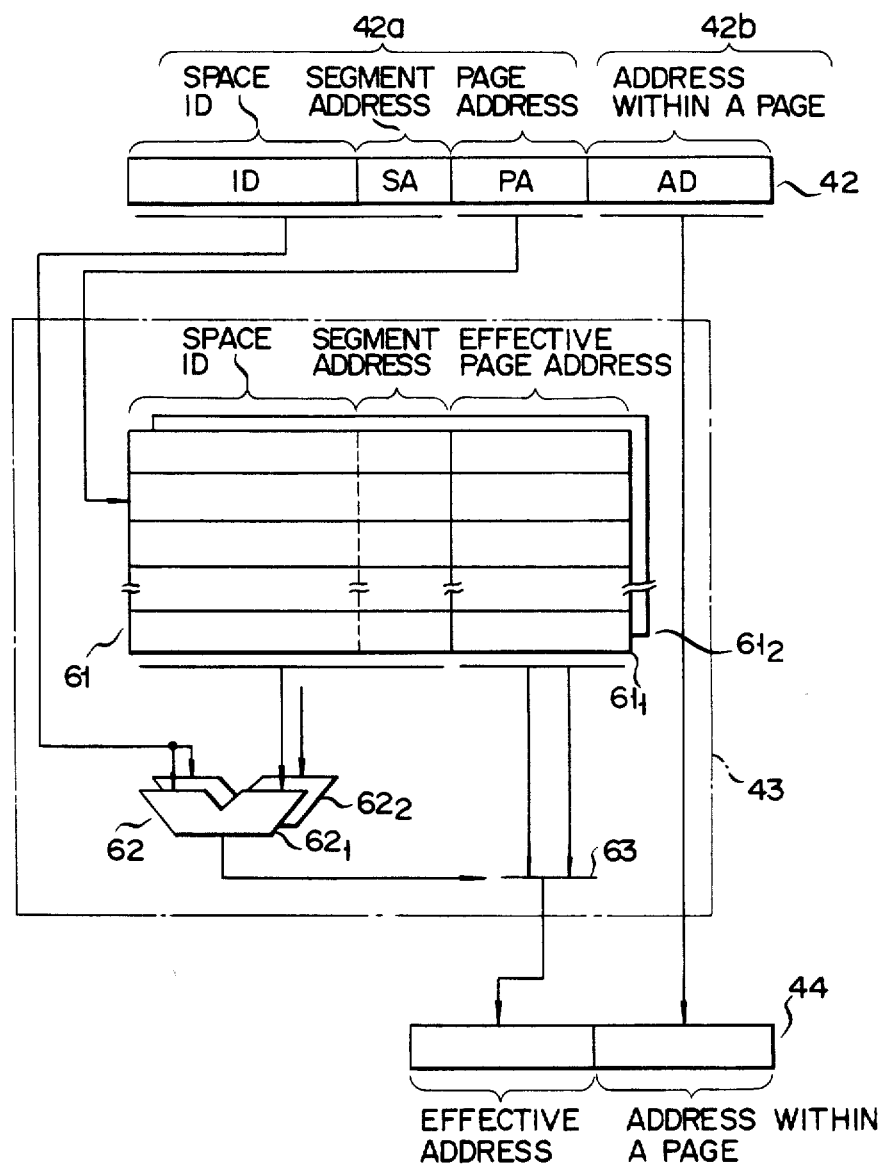

INFORMATION PROCESSING APPARATUS FOR VIRTUAL STORAGE CONTROL SYSTEM

BACKGROUND OF THE INVENTION

The present invention relates to an information processing apparatus for a virtual storage control system which has a buffer memory.

A conventional information processing apparatus of this type has a configuration as shown in FIG. 1. Referring to FIG. 1, when a main memory 2 (to be referred to as an MM 2 for brevity hereinafter) is accessed from a central processing unit 1 (to be referred to as a CPU 1 for brevity hereinafter), a virtual address produced on an address bus 3 by the CPU 1 is converted into a real address by an address conversion section 4. The real address is transferred to a main memory controller 6 (to be referred to as an M-CNT 6 for brevity hereinafter) and to a buffer storage 7 through an address bus 5. On the other hand, when the MM 2 is accessed from a channel 8 (or a DMA unit), the virtual address generated by the channel 8 is converted into a real address by an address conversion section 8a within the channel 8. When the number of channel 8 is plural, each channel is provided with the address conversion section 8a. The real address is then transferred through a DMA bus 9 to a DMA controller 10 (to be referred to as a DMA-CNT 10 for brevity hereinafter) for controlling the DMA bus 9. The real address on the DMA bus 9 is transferred to the M-CNT 6 and to the buffer storage 7 under the control of the DMA-CNT 10. The buffer storage 7 comprises a high-speed memory element and is incorporated to achieve high-speed processing (memory access) of the information processing apparatus and stores a copy of part of the contents stored in the MM 2. The buffer storage 7 is accessed by the real address produced from the address conversion section 4 or from the DMA-CNT 10. If the buffer storage 7 is accessed for memory read and the desired data is stored, the corresponding data is read out on a data bus 11 or on a DMA bus 9. Referring to FIG. 1, reference numeral 12 denotes a memory bus.

In the conventional information processing apparatus of the configuration as described above, the buffer storage 7 must be accessed using the real address which is obtained by address conversion by the address conversion section 4. This results in a long memory access time.

In an information processing apparatus which adopts a multi-virtual storage control technique, the address conversion buffer must be rendered ineffective every time the virtual space is switched. This also applies to the buffer storage. The conventional information processing apparatus requires hardware for this purpose. Moreover, since the address conversion buffer is rendered ineffective, the hit rate in accessing the address conversion buffer is lowered, and the processing speed is decreased.

SUMMARY OF THE INVENTION

It is an object of the present invention to provide an information processing apparatus wherein processing for memory access may be performed at high speed.

It is another object of the present invention to provide an information processing apparatus wherein a hit rate for accessing an address conversion buffer or a buffer storage is much improved.

In order to achieve the above objects, there is provided according to the present invention an information processing apparatus for a virtual storage control system, comprising:

a main memory;

buffer storage means including a directory and a data storage region for storing a copy of part of storage data in said main memory;

address converting means for converting a virtual address into an effective address;

a central processing element for simultaneously supplying the virtual address to said buffer storage means and to said address converting means in order to access said main memory;

a channel for simultaneously supplying the virtual address to said buffer storage means and to said address converting means in order to access said main memory; and read means for reading data from the corresponding data storage region when an address information designated by the virtual address supplied from said central processing element or from said channel is registered in the directory of said buffer storage means and for reading data from said main memory using the effective address obtained from said address converting means which is accessed at the same time as said buffer storage means when the address information is not registered in the directory of said buffer storage means.

In the information processing apparatus of the present invention, since an access to the buffer storage may be performed using the virtual address before address conversion, address conversion from the virtual address into a real address by the address conversion section may be performed in parallel with access to the buffer memory, so that high-speed memory access may be performed. Furthermore, since a space ID (address space identification data) for identifying the virtual space is included in the virtual address for accessing the address conversion buffer or the buffer memory, the spaces may not overlap even if the virtual space is switched from one to another. For this reason, the address conversion buffer and the buffer memory need not be rendered ineffective even if the virtual space is switched. Hardware for rendering the address conversion buffer and the buffer memory ineffective is not required.

BRIEF DESCRIPTION OF THE DRAWINGS

FIG. 4 is a view showing the format of a virtual address according to the embodiment shown in FIG. 2;

FIG. 5 is a detailed block diagram of an address conversion buffer 43 shown in FIG. 2.

DETAILED DESCRIPTION OF THE PREFERRED EMBODIMENT

Figure 1:
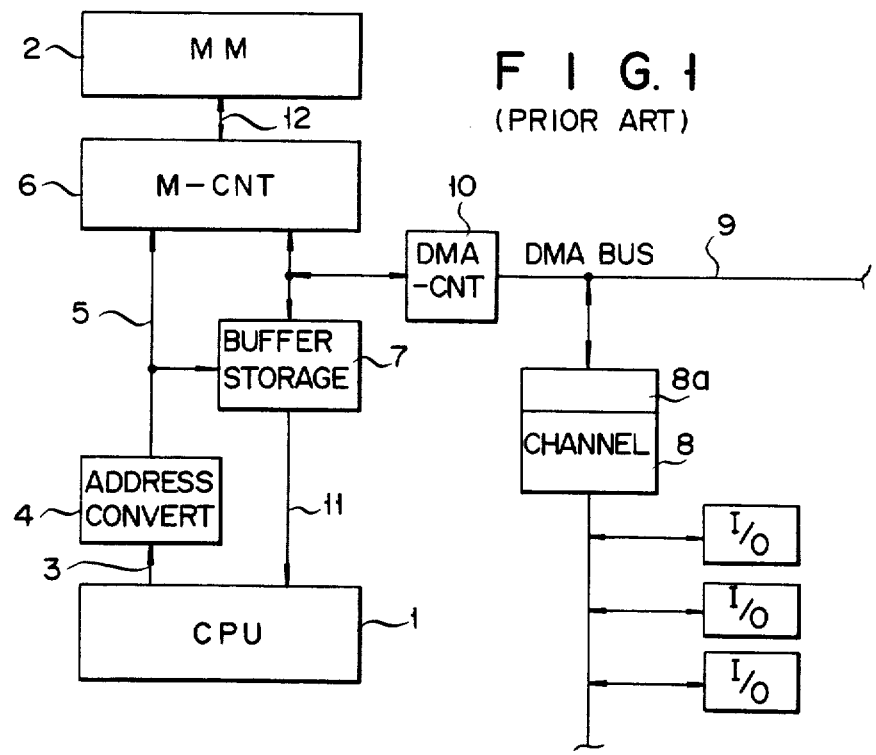
FIG. 1 is a block diagram of a conventional information processing apparatus for a virtual storage control system which has a buffer storage.
Figure 2:
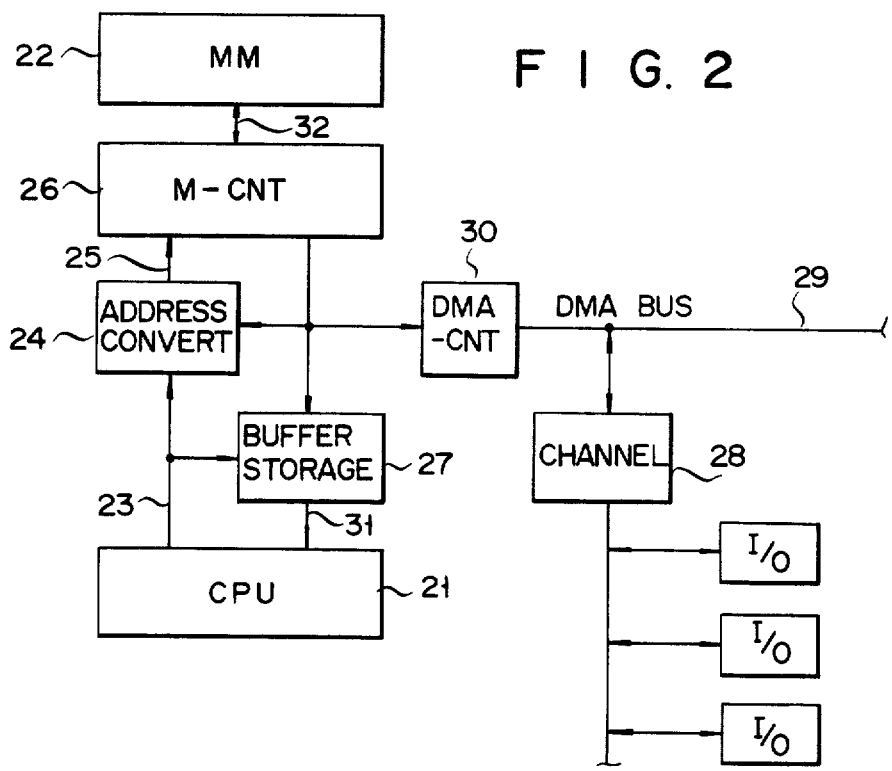
FIG. 2 is a block diagram of an information processing apparatus for a virtual storage control system according to an embodiment of the present invention.

FIG. 2 is a block diagram of an information processing apparatus for a virtual storage control system according to an embodiment of the present invention. A virtual address produced from a CPU 21 is supplied to an address conversion section 24 and to a buffer storage 27 through an address bus 23. The address conversion section 24 converts this virtual address on the address bus 23 and a virtual address transferred from a DMA-CNT 30 (to be described later) into real addresses. The real addresses produced from the address conversion section 24 are supplied to an M-CNT 26 through an address bus 25. Based on the input real addresses, the M-CNT 26 performs a read access or a write access to an MM 22. The buffer storage 27 stores part of the storage contents of the MM 22 and is accessed by the virtual address on the address bus 23 and by the virtual address transferred from the DMA-CNT 30. When the corresponding record of the buffer storage 27 is hit in accordance with these virtual addresses, that is, when the required information is stored in the buffer storage, the CPU 21 fetches the corresponding data through a data bus 31. If the corresponding record is not hit, the CPU 21 fetches the desired block data from the MM 22 in accordance with the real addresses produced from the address conversion section 24 through a memory bus 32, the M-CNT 26, the buffer storage 27 and the data bus 31. Unlike the conventional information processing apparatus, a channel 28 (to be referred to as a DMA unit 28 hereinafter) does not have an address conversion section. Therefore, the DMA unit 28 supplies the input virtual address to the buffer storage 27 and to the address conversion section 24 through a DMA bus 29 and the DMA-CNT 30.

Figure 3:
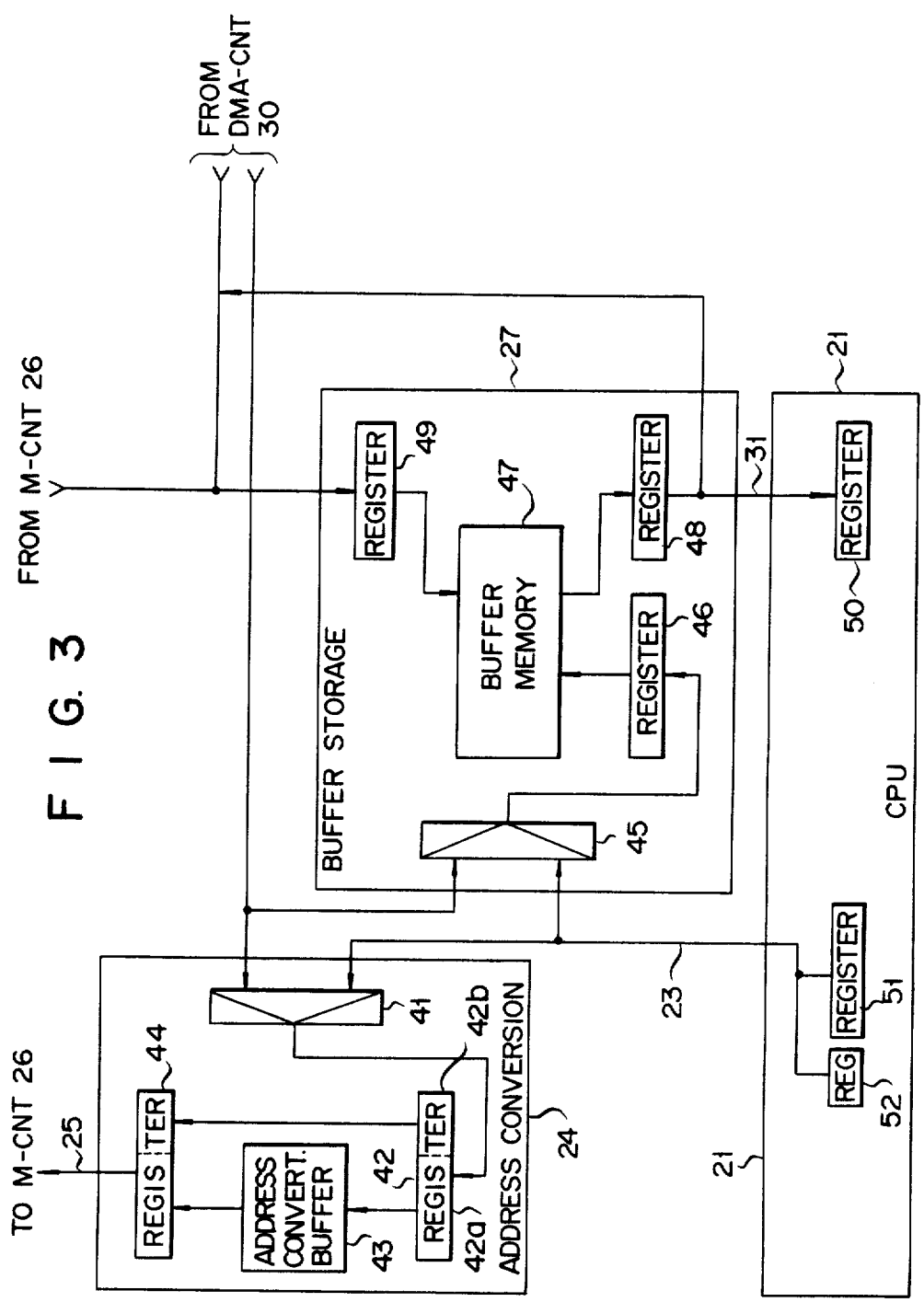
FIG. 3 is a detailed block diagram showing the configuration of the main part of the embodiment shown in FIG. 3.

FIG. 3 is a block diagram showing the details of the configuration of the main part of the apparatus shown in FIG. 2. In the address conversion section 24, a selector 41 selects one of the virtual addresses transferred from the CPU 21 through the address bus 23 and the DMA-CNT 30, respectively. The virtual address output from the selector 41 is held in a register 42. On the basis of an output from a first specific field 42a of the register 42, an address conversion buffer 43 is accessed to generate a corresponding effective page address. A register 44 stores a real address which is the sum data of the output (effective page address) from the address conversion buffer 43 and the output (address within a page) from a second specific field 42b.

In the buffer storage 27, a selector 45 selects one of the virtual addresses transferred from the CPU 21 through the address bus 23 and the DMA-CNT 30, respectively. The virtual address output from the selector 45 is held in a register 46. A buffer memory 47 is accessed in accordance with the virtual address held in the register 46 to read out the corresponding data or write the contents of the register 49. The data read out from the buffer memory 47 is held in a register 48. The data transferred from the DMA-CNT 30 and the data read out from the MM 22 are held in a register 49 and are then stored in the buffer memory 47.

In the CPU 21, the data transferred from the register 48 of the buffer storage 27 is held in a register 50. An address (logical address) produced during access to the MM 22 from the CPU 21 is held in a register 51, and address space identification data or space ID for identifying the address space actually operating in the multi-virtual space is held in a register 52. The address held in the register 51 is the logical address in one virtual space, and corresponds to the virtual address in the prior art. Note that a virtual address in this embodiment of the present invention is the sum data of the contents (logical address within one virtual space) of the register 51 and the contents (space ID) held in the register 52. More specifically, a virtual address in this embodiment consists of a space ID 55 and a logical address 56 specified thereby, as shown in FIG. 4.

FIG. 5 is a detailed view of the memory format in the address conversion buffer 43. The address conversion buffer 43 has an address conversion table 61 consisting of, for example, memories $61_1$ and $61_2$ of a set associative type. The address conversion table 61 is a table which shows the correspondence between the space ID, the segment address, and the effective page address of the page address. In this embodiment, the logical address of the virtual address consists of a segment address SA, a page address PA and an address within a page AD, as shown in FIG. 5. A group of comparators $62_1$ and $62_2$ detect for each of the memories $61_1$ and $61_2$ coincidence between the sum data (conversion pair) of the space ID and the segment address read out from the address conversion table 61, and the sum data of the space ID and the segment address SA in the virtual address held in the register 42. A selector 63 selects the effective page address read out from the address conversion table 61 (memories $61_1$ and $61_2$) in accordance with the output from the group of comparators 62.

Figure 6:
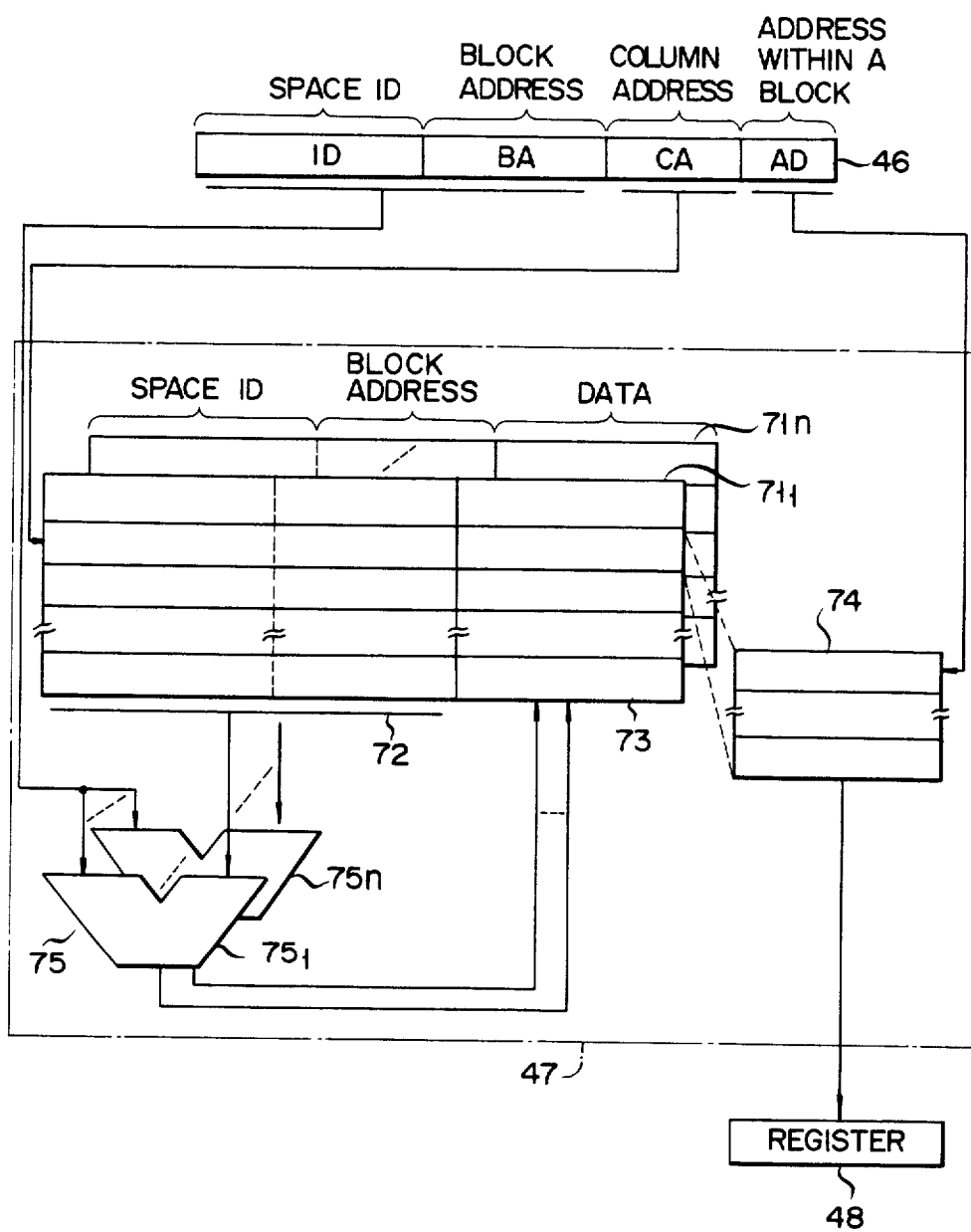
FIG. 6 is a detailed block diagram of a buffer memory 47 shown in FIG. 2.

FIG. 6 is a view showing the details of the buffer memory 47. The buffer memory 47 has a directory 72 and a block data storage section 73 consisting of memories $71_1$ through $71_n$ of set associative type. The directory 72 is a table which shows the correspondence between the space ID and the block address within a column address. The block data storage section 73 stores a copy of the (block data) contents of the block of the MM 22 which corresponds to the sum data of the space data ID and the block address registered in the directory 72. A data storage region 74 is shown, for the brevity of the description, by extracting a storage section corresponding to a given column address in, for example, the memory $71_1$ of the block data storage section 73. Therefore, the data storage region 74 is, actually in the block data storage section 73. In this embodiment, the logical address of the virtual address consists of the block address BA, the column address CA and the address within a block AD, as shown in FIG. 6.

A group of comparators $75_1$ through $75_n$ detect for each of the memories $71_1$ through $71_n$ coincidence between the sum data of the space ID and the block address BA read out from the directory 72, and the sum data of the space ID and the block address BA within the virtual address held in the register 46. A data storage region of the block data storage section 73 (memories $71_1$ through $71_n$) is selected in accordance with the output from the comparator which has such coincidence.

The mode of operation of the embodiment of the present invention as described above will now be described. A case will first be described for performing memory read from the CPU 21. The space ID which identifies the current virtual space is held in the register 52 of the CPU 21. The space ID is supervised by an operating system. The logical address which identifies the current virtual space is held in the register 51 of the CPU 21. The sum data of the contents stored in the registers 51 and 52, that is, the virtual address, is transferred to the address conversion section 24 and to the buffer storage 27 through the address bus 23.

The virtual address transferred to the address conversion section 24 is held in the register 42 through the selector 41. Next, the page address PA of the virtual address held in the register 42 is supplied to the address conversion buffer 43, and each of the memories $61_1$, $61_2$ the address conversion table 61 is indexed. As a result of this, the effective page address and sum data (conversion pair) of the corresponding space ID and the segment address are read out from the memories $61_1$ and $61_2$. The comparators $62_1$, $62_2$ compare the sum data of the space ID in the register 42 and the segment address SA with the conversion pair read out from the memories $61_1$ and $61_2$ to detect whether or not the conversion pair coincident with the virtual address is registered in the address conversion table 61 (memories $61_1$ and $61_2$). If the coincident signal is produced from, for example, the comparator $62_1$, the coincident conversion pair is registered in the memory $61_1$ of the address conversion table 61. That is, the coincident conversion pair is hit. From the comparator $62_1$, the coincident signal is supplied to the selector 63 as a selection signal. Then the effective address read out from the memory $61_1$ is output through the selector 63 to the register 44. Accordingly, the real address which is the sum data of the effective page address produced from the selector 63 and the address within a page AD which is included in the virtual address is held in the register 42.

On the other hand, if the coincident conversion pair is not registered in the address conversion table 61, an interrupt is made and address conversion is performed using the address conversion table in the specified area of the MM 22. A signal indicating the generation of an interrupt can be produced by ANDing the inverted coincident signals from the comparators $62_1$ and $62_2$. Since the mode of operation of these memories $61_1$ and $61_2$ of set associative type and the method of address conversion according to the address conversion table are well known, a description thereof will be omitted.

In parallel with the conversion processing from the virtual address to the real address by the address conversion section 24, the buffer storage 27 is accessed. The virtual address transferred to the buffer storage 27 is held in the register 46 through the selector 45. The column address CA included in the virtual address held in the register 46 is supplied to the buffer memory 47 and the directory 72 is indexed. Pieces of sum data each consisting of the space ID and the block address are read out from the memories $71_1$ through $71_n$. The group of comparators $75_1$ and $75_2$ detect whether any piece of sum data of the space ID and the block address which are read out from the memories $71_1$ through $71_n$ coincides with the sum data of the space ID and the block address BA in the virtual address held in the register 46. If there is such a piece of sum data, for example a coincident signal is produced from the comparator $75_1$, the signal is supplied to the memory $71_1$ as a selection signal for selecting the corresponding data storage section of the block data storage section 73. Then, the selected data storage region, for example, the data storage region 74 is shown outside of the block data storage section 73 for convenience. The read location is specified by the address within a block AD held in the register 46, and the corresponding data of the block data is read out into the register 48. The readout data is held in the register 48 and is transferred to the CPU 21 through the data bus 31.

Accordingly, during the operation of reading data from the MM 22 by the CPU 21, the required information can be immediately obtained from the buffer storage 27 if the information is stored in the buffer storage 27. On the other hand, the access for the MM 22 under the control of the M-CNT 26 using the effective address from the address conversion section 24 is terminated by the generation of the coincident signal indicating that the required data is hit.

The description of reading data from the MM 22 by the channel 28 is omitted as it is same as the above read operation by the CPU 21, except for the operations of the selectors 41 and 45.

A case of write access of the MM 22 from the channel 28 will now be described. If the contents stored in the region of the MM 22 in which the data read out from the I/0 device under the control of the channel 28 are to be written are stored in the buffer memory 47, the data must be written in the MM 22 as well as in the buffer memory 47. The virtual address supplied on the DMA bus 29 for accessing the MM 22 from the DMA unit 28 is transferred through the selectors 41 and 45 to the address conversion section 24 and to the buffer storage 27 through the DMA-CNT 30. The transferred address is held in the registers 42 and 46 of the address conversion section 24 and the buffer storage 27, respectively, as in the case of accessing from the CPU 21 as described above. On the basis of the contents (virtual address) in the register 46, the directory 72 in the buffer memory 47 is referred to. If the block represented by the virtual address is present, the data transferred through the register 49 from the DMA-CNT 30 is written into the data storage region in the block data storage section 73. As in the case of the access from the CPU 21 as described above, the virtual address is converted into the real address by the address conversion section 24 in parallel with the accessing operation to the buffer memory 47. The real address produced by the address conversion section 24 is transferred to the M-CNT 26. Data from the DMA-CNT 30 is also transferred to the M-CNT 26. Using the real address, the MM 22 is accessed from the M-CNT 26, and the data which is the same as that written in the buffer memory 47 is written in the MM 22.

The description of reading data from the MM 22 by the CPU 21 is omitted as it is same as the above read operation by the channel 28 except for the operations of the selectors 41 and 45.

What is claimed is:

1. An information processing apparatus for a virtual storage control system, comprising:
 a main memory;
 buffer storage means including a directory and a data storage region for storing a copy of part of storage data in said main memory;
 address converting means for converting a virtual address into an effective address;
 a central processing element for simultaneously supplying the virtual address to said buffer storage means and to said address converting means is order to access said main memory;
 a channel for simultaneously supplying the virtual address to said buffer storage means and to said address converting means in order to access said main memory; and
 read means for reading data from the corresponding data storage region when an address information designated by the virtual address supplied from said central processing element or from said channel is registered in the directory of said buffer storage means and for reading data from said main memory using the effective address obtained from said address converting means which is accessed at the same time as said buffer storage means when the address information is not registered in the directory of said buffer storage means.

2. An apparatus according to claim 1, wherein said address converting means and said buffer storage means are provided with selector means for selecting one of the virtual addresses from said central processing element and the virtual address from said channel.

3. An apparatus according to claim 1, wherein said buffer storage means includes a plurality of buffer memories for each of multi-virtual spaces, and said buffer memories comprise directories consisting of block address data and space identification data for identifying said multi-virtual spaces and block data storage regions in which a part of block data of said main memory is stored.

4. An apparatus according to claim 1 or 3, wherein said buffer storage means comprises means for reading space identification data and block addresses for each virtual space from the directories of said plurality of buffer memories in accordance with a column address of the virtual address;

a plurality of comparing means for comparing the space identification data and block address of the virtual address and the space identification data and block addresses read out from the directories; and means, when a coincident signal is produced from any of the plurality of comparing means, for reading data from an address specified by an address within a block of the virtual address in the data storage region corresponding to the comparing means for producing the coincident signal.

5. An apparatus according to claim 1, wherein said address converting means has a plurality of address conversion tables for each of said multi-virtual spaces, and said address conversion table has space identification data for identifying said multi-virtual spaces, segment address data and effective page address data.

6. An apparatus according to claim 1 or 5, wherein said address converting means comprises means for reading the space identification data, segment addresses and effective page addresses for each virtual space from said plurality of address conversion tables in accordance with the page address of the virtual address;

a plurality of comparing means for comparing space identification data and segment address of the virtual address and space identification data and segment addresses read out from said address conversion tables;

means, when a coincident signal is produced from any of said plurality of comparing means, for selecting the effective address read out from the address conversion table corresponding to the comparing means for producing the coincident signal; and means for generating the effective address by combining the selected effective page address and the address within a block of the virtual address.

7. An apparatus according to claim 4 or 6, wherein the virtual address produced by said central processing element and said channel consists of space identification data for identifying multi-virtual spaces and a virtual address within one of said virtual spaces.

* * * * *